3,337,492
HIGH-TEMPERATURE STABILIZATION OF CERTAIN ACRYLIC ELASTOMERS
Thomas Frederick Waldron, Hillsborough Township, Somerset County, and Frederick France Mihal, Dunellen, N.J., assignors to American Cyanamid Company, Stamford, Conn., a corporation of Maine
No Drawing. Filed June 8, 1965, Ser. No. 462,432
4 Claims. (Cl. 260—45.7)

This invention relates to acrylic elastomers containing reactive halogen. More particularly, it relates to vulcanizable compositions of such acrylic elastomers containing a high temperature stabilizer, to the process of vulcanizing said compositions, and to the resulting vulcanized acrylic elastomers.

Specialty vulcanizable elastomers based on copolymers of lower alkyl acrylates, particularly ethyl acrylate and a minor proportion of a copolymerizable chlorine-containing monomer, such as vinyl chloroacetate, 2-chloroethyl vinyl ether, or 2-chloroethyl acrylate, are known. These elastomers, when vulcanized, have excellent resistance to heat, i.e. to maximum temperatures in the range of 300° to 350° F. and are also highly resistant to mineral oils, ozone, ultraviolet light, flexural breakdown, compression set and gas diffusion. They have been used extensively for preparing automotive engine gaskets and seals in which capacity they have far out-performed conventional hydrocarbon rubbers. As engines with higher performance characteristics are continually being introduced, so, too, is there an increased need for more heat-resistant gasketing and sealing materials. There is need for an elastomer having the desirable properties of the acrylic elastomers, but with resistance to temperatures above the 300–350° F. range. A known elastomer based on a copolymer of hexafluoropropylene and vinylidene fluoride, has resistance to high temperatures (about 600° F.), but this elastomer is interdicted from large scale usage by its very high price. Acrylic elastomers are about one-eighth the price. There is, then, the additional requirement that the high-temperature elastomer must be relatively inexpensive.

It is, therefore, the major object of the present invention to provide a vulcanizable acrylic elastomeric composition which gives a vulcanized elastomer with excellent high-temperature characteristics. Other objects will be made clear from the ensuing description of this invention.

It has now been discovered that a vulcanized acrylic elastomer having the desirable properties of acrylic elastomers and the added feature of increased heat resistance, can be provided by vulcanizing an elastomer based on a copolymer of a major portion of a lower alkyl acrylate and a minor proportion of vinyl chloroacetate in the presence of an alkali metal sulfate or ammonium sulfate of a long chain fatty alcohol. It is surprising that these sulfates do not have the same beneficial effect upon elastomers prepared from ethyl acrylates and other halogen monomers such as 2-chloroethyl vinyl ether or 2-chloroethyl acrylate.

Elastomers based on copolymers of alkyl acrylates and vinyl chloroacetate are described and claimed in application Ser. No. 203,463, filed June 19, 1962, now U.S. Patent No. 3,201,373. The alkyl acrylates employed as monomers may be straight or branched chain. One acrylate ester may be used alone or several in combination. Useful results are obtained using such acrylate esters as the methyl, ethyl, propyl, butyl, hexyl and octyl; however, the ethyl and butyl esters are preferred. The product copolymer should contain at least seventy weight percent of the alkyl acrylate. A sufficient amount to obtain this result must be used in the polymerizable mix. Preferably, the vinyl chloroacetate (VCA) should comprise from about two to about eight weight percent of the whole polymerizable mix. In some cases, if necessary or desirable to obtain special properties, this may be reduced to as little as about 0.5% or increased to about 15%. Also, if so desired, the product copolymer may contain one or more additional copolymerized compatible comonomers, such as, for example, acrylonitrile. When used, such extraneous comonomers may comprise as much as about fifteen percent of the composition.

The unvulcanized product should contain at least about 0.4 weight percent of chlorine. It is more desirable that a minimum of about 0.6% be present. For some purposes the chlorine content may be as high as about three percent. In general use, however, a chlorine content of up to about two percent is preferred; and highly desirable products and those most preferred contain some 0.90 to about 1.05 percent of chlorine.

In general, the vulcanized elastomer of this invention is produced by vulcanizing the above-described copolymer in the presence of an alkali metal sulfate or ammonium sulfate of a long chain fatty alcohol using an ammonium salt of a weak acid as a vulcanizing agent. If desired, an alkyl or aryl halide can be used with the ammonium salt. Although this invention applies to acrylic elastomers prepared from any lower alkyl acrylate and vinyl chloroacetate, the preferred alkyl acrylate is ethyl acrylate.

The alkali metal sulfates and ammonium sulfates of long chain fatty alcohols are anionic surface active agents. Other anionic surface active agents, such as alkali metal stearates, are not useful for purposes of this invention. Cationic and nonionic surface active agents also are not useful.

The useful alkali metal sulfates and ammonium sulfates of long chain fatty alcohols may be represented by the formula:

$$R-O-SO_2-O-M$$

wherein R is a straight or branched chain alkyl group of 7–20 carbon atoms, and M is ammonium or an alkali metal such as sodium and potassium. The salts may be named as alkali metal or ammonium alkyl sulfates. Representative sulfates include sodium 2-ethylhexyl sulfate, ammonium 2-ethylhexyl sulfate, ammonium dodecyl sulfate, sodium tridecyl sulfate, sodium 7-ethyl-2-methyl-1-decyl sulfate, sodium hexadecyl sulfate, sodium 3,9-diethyltridecyl sulfate and sodium 1-propylpentadecyl sulfate. Sodium 2-ethylhexyl sulfate is preferred. Combinations of two or more sulfates may be used.

The amount of alkali metal sulfates or ammonium sulfates of long chain fatty alcohols should be between 0.25 and 10%, preferably between 1 and 5%, based on the weight of the elastomer.

No change is required in the normally employed vulcanization temperatures and times as known in the art. A post-cure heating period may be used, if desired.

Additives such as carbon black or other pigments, antioxidants, stearic acid, lubricants, etc., may be included in the compositions of this invention.

The following examples, in which parts and percentages are by weight, are presented to illustrate this invention.

Example 1

A. A master batch containing 100 parts of a 97.5/2.5 ethyl acrylate/vinyl chloroacetate elastomer, 50 parts of FEF carbon black and one part of stearic acid was prepared. The master batch was milled on a rubber mill with 4 parts of ammonium benzoate, 2 parts of lauryl bromide, 2 parts of phenyl-$\beta$-naphthylamine and 2 parts of sodium 2-ethylhexyl sulfate.

B. A composition similar to A, but with the sodium 2-ethylhexyl sulfate omitted, was also prepared.

Both compositions were vulcanized in a mold under pressure at a temperature of 165° C., composition A for 8 minutes and composition B for 7 minutes. The vulcanized elastomers were then post-cured at 177° C. for 8 hours. Vulcanization times were selected to give elastomers having approximately the same state of cure after the post-curing period.

The physical properties of the vulcanizates are shown in the following table. The aging tests were carried out in air at 350° F. and 400° F. for 70 hours according to ASTM standard methods.

TABLE I

|  | A | B |
|---|---|---|
| Tensile strength, p.s.i | 2,127 | 2,227 |
| Elongation, percent | 150 | 147 |
| Modulus, 100%, p.s.i | 1,720 | 1,437 |
| Hardness, Shore A | 73 | 72 |
| Aging Tests, 350° F.: |  |  |
| Tensile strength change, percent | +3 | −8 |
| Elongation change, percent | −23 | −37 |
| Hardness change, percent | +5 | +9 |
| Aging Tests, 400° F.: |  |  |
| Tensile strength change, percent | −49 | −71 |
| Elongation change, percent | +9 | −73 |
| Hardness change, percent | +7 | +21 |

This example shows that by incorporating sodium 2-ethylhexyl sulfate in the elastomer composition, the vulcanized elastomer has an increased resistance to degradation at high temperatures. With the sulfate ester, there is less decrease in tensile strength and elasticity and less increase in hardness at elevated temperatures. This effect is particularly apparent at 400° F.

Example 2

A. A master batch containing 100 parts of a 97.5/2.5 ethyl acrylate/vinyl chloroacetate elastomer, 60 parts of FEF carbon black and one part of sodium stearate was prepared. The master batch was milled with 4 parts of ammonium benzoate, 2 parts of lauryl bromide, 2 parts of phenyl-$\beta$-naphthylamine and 2 parts of sodium 2-ethylhexyl sulfate.

B. A composition similar to A, but with the sodium 2-ethylhexyl sulfate omitted, was also prepared.

Compositions A and B were vulcanized in a mold under pressure at a temperature of 165° C. for 7 and 8 minutes, respectively. Both were then post-cured for 8 hours at 177° C.

The physical properties and changes in physical properties due to aging at 400° F. are shown in Table II.

TABLE II

|  | A | B |
|---|---|---|
| Tensile strength, p.s.i | 2,240 | 2,230 |
| Elongation, percent | 107 | 100 |
| Modulus, 100%, p.s.i | 2,143 | 2,230 |
| Hardness, Shore A | 83 | 81 |
| Aging Tests, 400° F.: |  |  |
| Tensile strength change, percent | −31 | −63 |
| Elongation change, percent | −33 | −60 |
| Hardness change, percent | +9 | +13 |

This experiment demonstrates the effectiveness of sodium 2-ethylhexyl sulfate in a formulation different from that of Example 1, i.e. with the stearic acid of Example 1 replaced by sodium stearate.

Example 3

A. A master batch containing 100 parts of a 97.5/2.5 ethyl acrylate/vinyl chloroacetate elastomer and 60 parts of FEF carbon black was prepared. The master batch was milled with four parts of ammonium benzoate, 2 parts of phenyl-$\beta$-naphthylamine and 1.2 parts of sodium 2-ethylhexyl sulfate.

B. A composition similar to A was prepared using 2 parts of sodium 2-ethylhexyl sulfate plus one part of lauryl bromide.

Compositions A and B were vulcanized at 165° C. for 7 minutes and then post-cured at 177° C. for 8 hours.

The physical properties and changes in physical properties due to aging at 400° F. are shown in Table III.

TABLE III

|  | A | B |
|---|---|---|
| Tensile strength, p.s.i | 2,490 | 2,497 |
| Elongation, percent | 137 | 123 |
| Modulus, 100%, p.s.i | 1,987 | 2,297 |
| Hardness, Shore A | 76 | 78 |
| Aging Tests, 400° F.: |  |  |
| Tensile strength change, percent | −55 | −54 |
| Elongation change, percent | +17 | +6 |
| Hardness change, percent | +8 | +12 |

This example demonstrates that neither stearic acid nor sodium stearate are essential. It also demonstrates that a lauryl bromide is not essential to obtain a good cure, although a product with a higher modulus is obtained when alkyl halide is employed.

Example 4

A. A master batch containing 100 parts of a 97.5/2.5 ethyl acrylate/vinyl chloroacetate elastomer, one part of sodium stearate and 50 parts of FEF carbon black was prepared. The master batch was compounded with 4 parts of ammonium benzoate, one part of phenyl-$\beta$-naphthylamine and 4 parts of sodium 2-ethylhexyl sulfate.

B. A composition similar to A was prepared substituting 10 parts of isooctylphenyl polyethylene glycol ether (a non-ionic surface active agent) for the sodium 2-ethylhexyl sulfate.

C. A composition similar to A was prepared substituting 10 parts of nonylphenyl polyethylene glycol ether (non-ionic) for the sodium 2-ethylhexyl sulfate.

Compositions A, B and C were vulcanized at 165° C. for 8 minutes and post-cured at 177° C. for 8 hours.

The physical properties and changes in physical properties due to aging at 400° F. are shown in Table IV.

TABLE IV

|  | A | B | C |
|---|---|---|---|
| Tensile strength, p.s.i | 1,240 | 1,050 | 1,063 |
| Elongation, percent | 245 | 255 | 270 |
| Modulus, 100%, p.s.i | 425 | 325 | 245 |
| Hardness, Shore A | 65 | 52 | 53 |
| Aging Tests, 400° F.: |  |  |  |
| Tensile strength change, percent | −55 | −59 | −68 |
| Elongation change, percent | +22 | −84 | −85 |
| Hardness change, percent | +13 | +34 | +30 |

This example demonstrates the fact that non-ionic surfactive agents are not effective stabilizers. The data for elongation and hardness change should be noted.

We claim:
1. A vulcanizable elastomeric composition comprising (1) a copolymer of a lower alkyl acrylate and vinyl chloroacetate, said copolymer having 0.4 to 3.0 weight percent chlorine; and (2) 0.25 to 10%, based on the weight of the copolymer, of at least one sulfate of the formula:

$$R-O-SO_2-O-M$$

wherein R is an alkyl group of 7–20 carbon atoms, and M is sodium, potassium or ammonium.

2. The composition of claim 1 wherein the alkyl acrylate is ethyl acrylate and the sulfate is sodium 2-ethylhexyl sulfate.

3. The elastomeric product obtained by vulcanizing the composition of claim 1.

4. The elastomeric product obtained by vulcanizing the composition of claim 2.

References Cited

UNITED STATES PATENTS

| | | | |
|---|---|---|---|
| 2,515,686 | 7/1950 | Barnes et al. | 260—45.7 X |
| 3,201,373 | 8/1965 | Haizerman | 260—79.5 |

DONALD E. CZAJA, *Primary Examiner.*

LEON J. BERCOVITZ, *Examiner.*

W. J. WELSH, *Assistant Examiner.*